F. GIESENHAUS.
CURRYCOMB.
APPLICATION FILED DEC. 11, 1913.

1,195,458.  Patented Aug. 22, 1916.

Witnesses  
Carroll Dailey  
C. H. Crawford

Inventor  
Fred Giesenhaus,  
By Richard Stevens  
his Attorney

UNITED STATES PATENT OFFICE.

FRED GIESENHAUS, OF MUSCATINE, IOWA.

CURRYCOMB.

1,195,458.   Specification of Letters Patent.   Patented Aug. 22, 1916.

Application filed December 11, 1913.   Serial No. 806,020.

*To all whom it may concern:*

Be it known that I, FRED GIESENHAUS, a citizen of the United States, residing at Muscatine, in the county of Muscatine and State of Iowa, have invented certain new and useful Improvements in Currycombs, of which the following is a specification.

The object of this invention is to provide a currycomb or like cleaning device wherein the currying or cleaning portions are in the form of separate elements disposed and arranged in such spaced relation but also in such proximity as to most effectively function when moved across the hide of an animal.

A further object of the invention is to provide a currycomb having movable currying elements which are arranged to constantly change their position with respect to the frame of the comb while in use so as to greatly increase the currying surfaces available and thereby eliminating or very greatly avoiding the clogging of the currying element by hair and dirt.

A further object of the invention is to provide a currycomb which can be produced at a greatly reduced cost with respect to combs now in use and wherein parts may be renewed without necessitating the purchase of a new comb.

Other features of novelty will be more fully described in connection with the accompanying drawing and will be more particularly pointed out and ascertained in and by the appended claims.

Figure 1:
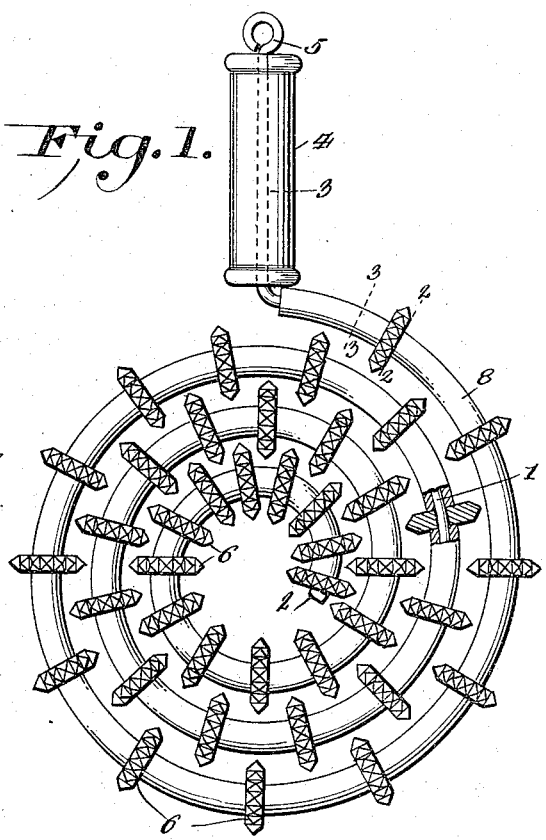
Figure 2:
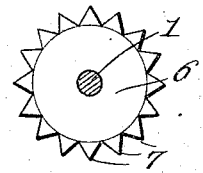
Figure 3:
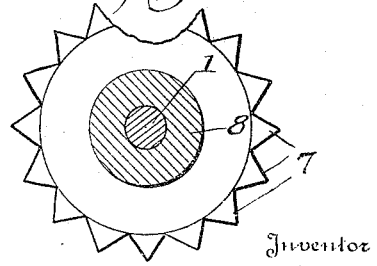

In the drawing:—Figure 1 is a view in elevation of a currycomb embodying one form of my invention. Fig. 2 is a sectional view on line 2—2 of Fig. 1. Fig. 3 is a sectional view on line 3—3 of Fig. 1.

Like characters of reference designate similar parts throughout the different figures of the drawing.

As illustrated, I provide a frame which is in the form of a convoluted rod or wire 1 which is shown in the form of a flat spiral having its inner end designated at 2 and its outer end bent radial to the flat spiral to form a support 3 for a handle 4. I may, if desired, eye the extreme end of the handle-supporting portion 3, as indicated at 5, so as to hold the handle 4 from removal during use.

I string on the support 1 a plurality of currying or cleaning elements 6 which are preferably in the form of disks having peripherally disposed currying or cleaning teeth 7. The currying elements are loosely disposed upon the convoluted support 1 so that when the comb is moved across the hide of the animal in different directions the elements 6 will be rotated so as to constantly present different teeth for cleaning contact. In the form shown, the supports 1 is convoluted in circular winds spirally disposed about a center and the currying elements are radially arranged but it will be understood that I do not wish to be limited to a convoluted arrangement of this particular type.

In order to maintain the elements 6 in suitable spaced relation with respect to each other, I interpose therebetween spacing elements which may be in the form of sleeves 8. The spacing sleeves are shown to be of different length and I preferably provide relatively short sleeves near the central portion of the comb and gradually lengthen the sleeves near outer portions thereof, the particular arrangement shown disposing the elements 6 in staggered radial relation. Those elements 6 near the center of the comb are disposed in closer relation than those on the outer winds and in the form shown, I not only radially stagger elements 6 but I proportion the same and convolute the support 1 so that said elements will overlap or interfit, one element of one wind projecting between adjacent elements of another wind of the support so that a continuous and uninterrupted comb-currying surface will be presented upon manual pressure engagement of the comb upon the body of the animal. I also provide a convoluted support 1 of wire which is to a greater or less extent resilient, so that the comb will flex under pressure against the hide of the animal and conform in a measured degree to undulations of the body presented thereto. This feature will be especially present where the handle is formed on one end of the convoluted support and where the other end is free, as in the present construction.

In assembling the comb, the spacing sleeves and currying disks will be alternately strung on the wire frame 1 and the free end 2 may be upset to hold the last element against release therefrom, the last spacing element being held by the handle 4 and the handle portion 3.

While I have herein shown and described one specific form of my invention, I do not wish to be limited thereto except for such limitations as the claims may import.

I claim:—

1. In a curry-comb, a convoluted frame, and a plurality of rotatable currying members mounted thereon, substantially as described.

2. In a currycomb, a convoluted support, and a plurality of currying disks thereon, said disks being independently rotatable in a plane to which said support is at right angles.

3. In a curry-comb, a convoluted supporting frame, and a plurality of toothed currying disks rotatably mounted on said frame, substantially as described.

4. In a curry-comb, a convoluted frame, a plurality of toothed currying elements independently movable thereon, and spacing elements on said frame for holding the toothed currying members in spaced relation with respect to each other, substantially as described.

5. In a curry-comb, a convoluted frame, and a plurality of toothed disk carrying elements mounted on said frame in staggered relation with respect to each other, substantially as described.

6. In a curry-comb, a convoluted frame, and a plurality of independently movable toothed currying elements mounted on said frame in staggered and overlapping relation with respect to each other, substantially as described.

7. In a curry-comb, a frame rod convoluted in spiral form with one end bent on a handle portion, and spacing and currying elements disposed in alternate relation on the winds of said rod, substantially as described.

8. In a curry-comb, a frame rod convoluted in spiral form with one end bent to form a handle portion, spacing sleeves and currying disks strung on said rod in alternate relation, substantially as described.

In testimony whereof I affix my signature in presence of two witnesses.

FRED GIESENHAUS.

Witnesses:
C. A. GIESENHAUS,
A. D. SINCLAIR.